United States Patent [19]

Rusk

[11] Patent Number: 4,689,020

[45] Date of Patent: Aug. 25, 1987

[54] WRITING AID

[76] Inventor: Chris E. Rusk, 1007 Wayne Ave., Crawfordsville, Ind. 47933

[21] Appl. No.: 848,082

[22] Filed: Apr. 7, 1986

[51] Int. Cl.[4] .............................................. G09B 11/02
[52] U.S. Cl. ....................................... 434/166; 401/6; 264/299
[58] Field of Search ............... 434/162, 166, 112, 233; 401/6, 7, 8; 132/73

[56] References Cited

U.S. PATENT DOCUMENTS

| | | | |
|---|---|---|---|
| 794,329 | 7/1905 | Whitehouse | 401/6 |
| 843,767 | 2/1907 | Plach | 401/6 |
| 945,026 | 1/1910 | Faust | 401/6 |
| 1,793,945 | 2/1931 | Mauthe | 401/6 |
| 1,807,415 | 5/1931 | La France | 401/6 |
| 1,879,456 | 9/1932 | Parsons | 401/7 |
| 2,864,384 | 12/1958 | Walter | 132/73 |
| 3,501,849 | 3/1970 | Olsen | 434/233 |
| 3,947,977 | 4/1976 | Bishop | 401/6 X |
| 4,030,841 | 6/1977 | Balasty | 401/6 |
| 4,076,427 | 2/1978 | Anderson | 401/6 |
| 4,149,811 | 4/1979 | Coffman | 401/6 |
| 4,167,347 | 9/1979 | Hoyle | 401/6 X |
| 4,526,547 | 7/1985 | Rusk | 434/166 |

FOREIGN PATENT DOCUMENTS 39911  9/1973  Australia .............................. 434/166

OTHER PUBLICATIONS

Newsweek, "Automated Teachers" Jul. 20, 1964, p. 55.

Primary Examiner—William H. Grieb
Attorney, Agent, or Firm—Killworth, Gottman, Hagan & Schaeff

[57] ABSTRACT

A device is disclosed for aiding in the gripping of an elongated hand held writing instrument. The device includes a body having a central bore for receiving the hand held writing instrument, and an exterior. The exterior includes a first gripping surface positioned for receiving the user's first finger; a second gripping surface positioned for receiving the user's second finger; and a third gripping surface positioned for receiving the user's third finger. At least one of the first, second and third gripping surfaces includes a surface indicia for providing a reference for placement of at least one of the user's fingers. The surface indicia comprises at least one character formed as a part of at least one of the first, second and third gripping surfaces. The character is disposed at a level different than the level of the area of the at least one surface adjacent to the character.

9 Claims, 10 Drawing Figures

U.S. Patent Aug. 25, 1987 Sheet 1 of 3 4,689,020
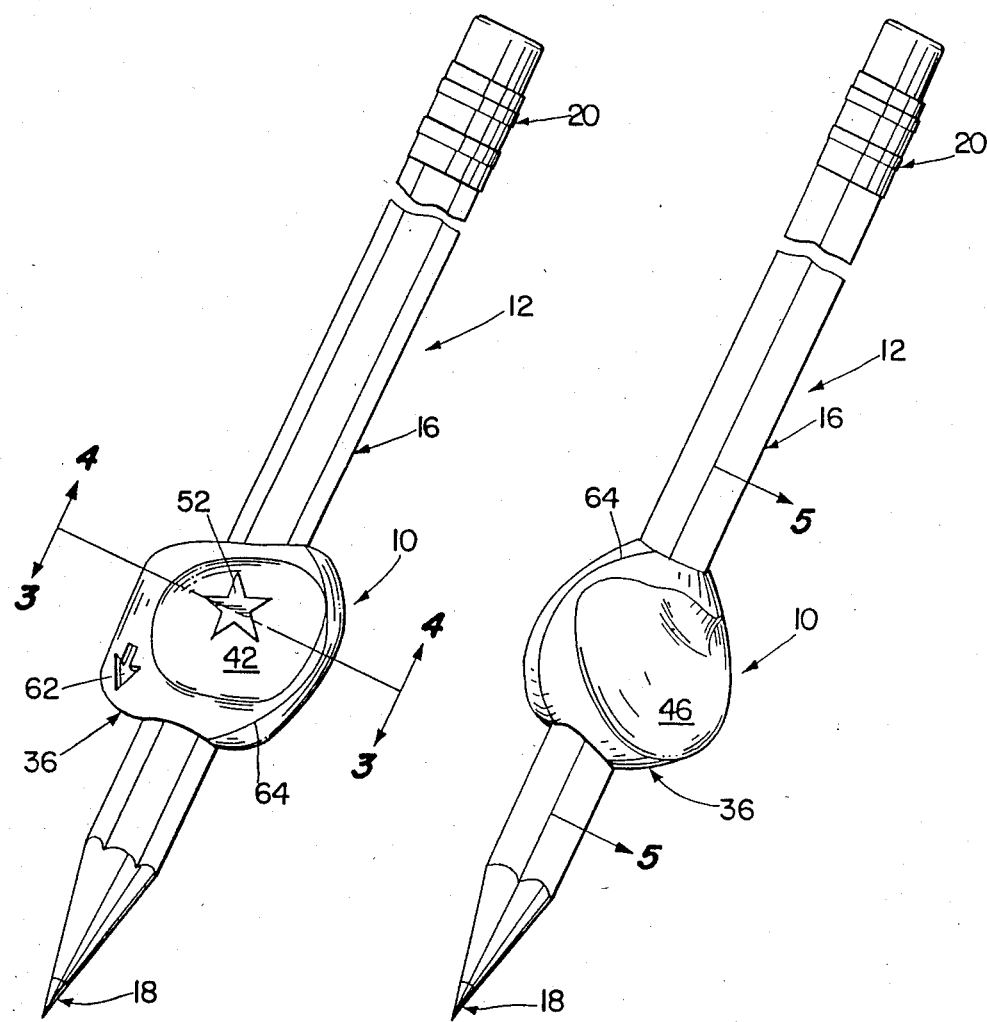
Fig. 1
Fig. 2
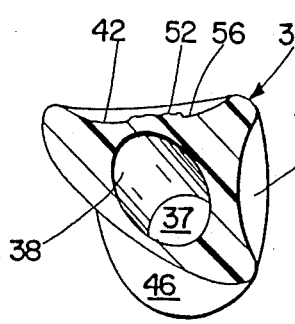
Fig. 3
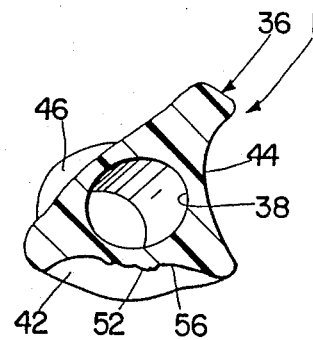
Fig. 4
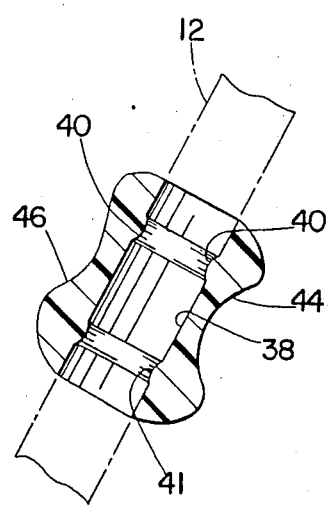
Fig. 5

WRITING AID

The present invention relates to a writing aid, and more particularly to an improved pencil grip for aiding persons in holding a pencil, or other writing instrument properly.

Persons first learning to write often grip writing instruments improperly. A person first learning to write will often grip a writing instrument in a position most comfortable to the person. This griping position may or may not be a proper position for holding the pencil.

In order to facilitate teaching of the proper manner in which to hold a writing instrument, the applicant invented the device shown in Rusk U.S. Pat. No. 4,526,547. The applicant has now invented several improvements to the device shown in the '547 patent. These improvements enable the device to perform its intended function in a manner superior to the prior device. These improvements also enable the device to be made less expensively, and hence be sold to the consumers less expensively than the prior device.

In accordance with the present invention, a device is provided for aiding in the gripping of an elongated hand held writing instrument. The device comprises a body having a central bore for receiving the hand held writing instrument, and an exterior. The exterior includes a first gripping surface positioned for receiving the user's first finger; a second gripping surface positioned for receiving the user's second finger; and a third gripping surface positioned for receiving the user's third finger. At least one of the first, second and third gripping surfaces includes a surface indicia means for providing a reference for placement of at least one of the user's fingers. The surface indicia means comprises at least one character formed as a part of at least one of the first, second and third gripping surfaces. The character is disposed at a level different than the level of the area of the at least one surface adjacent to the character.

Preferably, the device also includes a direction indicating means for indicating the proper direction of placement of the device on the pencil.

Additionally, the device can include an improved gripping means for permitting the device to grip the barrel of writing instrument securely, while permitting the device to be moved along the barrel relatively easily.

One feature of the present invention is that the device includes a direction indicating means for indicating the proper direction of placement of the device on a writing instrument. Preferably, this direction indicating means comprises of an arrow formed as a part of the device. The applicant has also found that those using devices without a direction indicating means often have difficulty orienting the device on a pencil properly. The direction indicating means helps those persons using the invention to place the device on the instrument properly.

Another feature of the present invention is that the surface indicia means and the direction indicating means are formed as a part of the device. Preferably, the surface indicia means and the direction indicating means are embossed or engraved into the exterior surface of the writing aid during the molding process. This feature has the advantage of making the device much less costly to manufacture. The applicant has found that the cost for placing the adhesive tags disclosed in the '547 patent onto the surface of the device often can be as great or greater than the cost of manufacturing the device itself. However, by forming the surface indicia means and direction indicating means as part of the device, very little cost is added to the product.

A further advantage of the embossed or engraved surface indicia means is that the presence of the embossed or engraved surface indicia means can be detected by touch alone. As the presence of the surface indicia means can be detected by touch, the user need not view the device in order to orient his fingers properly on the device.

An additional feature of the present invention is that an improved gripping means is provided. The improved gripping means includes: (1) a central bore which is formed to have a diameter sized to permit the writing aid to slip easily along the barrel of the writing instrument; (2) at least one arcuate gripping ring segment disposed on the wall of the central bore; (3) the use of a relatively more pliable material for the device; and (4) a decrease in the thickness of the wall of the central bore. The improved gripping system has several advantages. One advantage provided by the relatively larger central bore is that the device can be placed on, moved along, and removed from the barrel of a writing instrument more easily than known devices. The gripping ring segments, more pliable plastic and relatively thinner wall have the advantage of working in combination to securely engage the device to the writing instrument when the device is in use. This secure engagement is effected through the natural squeezing action of the user's fingers on the device when the device is in use. This squeezing action is transmitted through the relatively thin, pliable plastic to force the gripping rings radially inwardly. This radially inward movement of the gripping rings causes the gripping rings to securely engage the surface of the writing instrument. This engagement holds the device in place on the writing instrument when the user is using the writing instrument.

These and other features of this invention and their inherent advantages will become apparent to those skilled in the art from the following description of preferred embodiments and the accompanying drawings illustrating the best mode of carrying out the invention as presently perceived wherein:

FIG. 1 is a front view of the present invention mounted on a writing instrument;

FIG. 2 is a rear view of the present invention mounted on a writing instrument;

FIG. 3 is a sectional view taken along lines 3—3 of FIG. 1;

FIG. 4 is a sectional view taken along lines 4—4 of FIG. 1;

FIG. 5 is a sectional view taken along lines 5—5 of FIG. 2;

Figure 6:
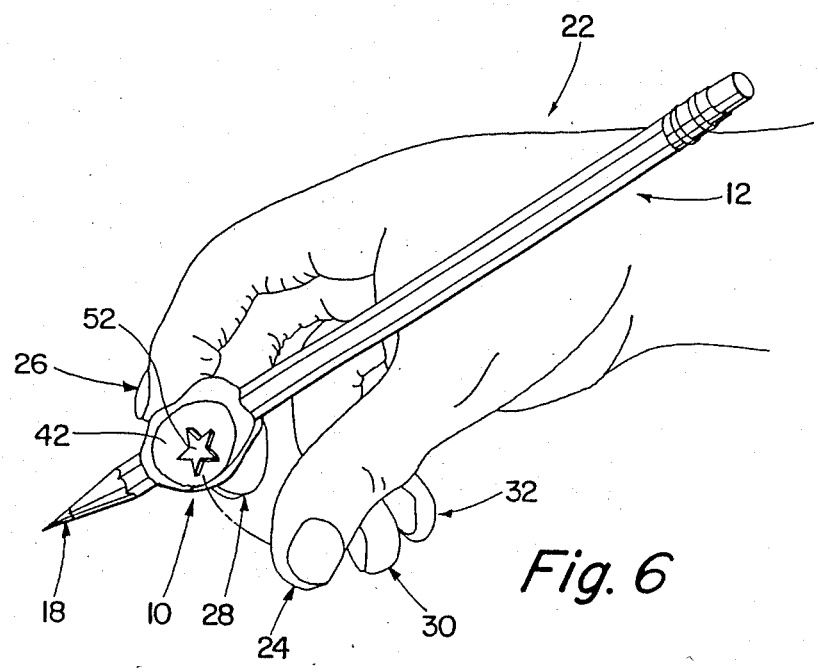
FIG. 6 is a perspective view of the present invention illustrating the orientation of the present invention with respect to a user's right hand.

The first embodiment of the writing aid 10 of the present invention is shown in FIGS. 1-6. The writing aid 10 is designed to be placed on a writing instrument such as a pencil 12. The writing aid 10 can be placed anywhere along the barrel portion 16 of the pencil 12. Most users find it most comfortable to place the writing aid 10 on the barrel 16 at a position somewhere close to the point end 18 of the pencil 12. However, other users have found it more comfortable to place the writing aid 10 further up the barrel 16, closer to the eraser 20 of the pencil 12. Additionally, some have found it advantageous to place a writing aid 10 in an inverted position adjacent to the eraser 20 to aid the user in gripping the pencil 12 when erasing material.

As best shown in FIG. 6, the writing aid 10 is designed to be gripped by the hand 22 of a user. The hand 22 shown in FIG. 6 includes five fingers, a first finger (thumb) 24, a second finger 26, a third finger 28, a fourth finger 30 and a fifth finger 32.

Referring to FIGS. 1-5, the writing aid 10 includes a body 36. Body 36 is preferably made out of a soft, pliable plastic material. The body 36 includes a generally cylindrical central bore 37 therethrough. The central bore 37 is defined by a generally cylindrical wall 38. Preferably, the cylindrical bore 37 has a diameter great enough to permit the user to fit the writing aid 10 on the writing instrument with which it is being used.

As best shown in FIG. 5, an upper arcuate gripping ring 40 and a lower arcuate gripping ring 41 are formed on the cylindrical wall 38. The gripping rings, 40, 41 extend radially inwardly from the cylindrical wall 38 and are provided for gripping the pencil 12. In the embodiment shown in FIG. 5, the gripping rings 40, 41 are complete annular rings.

The exterior of the writing aid 10 includes three exterior gripping surfaces. The three exterior gripping surfaces include first gripping surface 42, second gripping surface 44, and third gripping surface 46. The first gripping surface 42 is provided for receiving the user's first finger (thumb) 24 and for properly positioning the user's first finger 24 on the pencil 12. The second gripping surface 44 is provided for receiving the user's second finger (index finger) 26 and for properly positioning the user's second finger 26 on the pencil 12. The third gripping surface 46 is provided for receiving the user's third finger 28, and for properly positioning the user's third finger 28 on the pencil 12. The shape and configuration of the first, second, and third gripping surfaces 42, 44, 46, respectively, are described in more detail in Rusk U.S. Pat. No. 4,526,547.

A surface indicia means is formed on the first gripping surface 42. The surface indicia means comprises a character 52, (shown as a star) which is formed as a part of the first gripping surface 42. As best shown in FIGS. 3 and 4, the character 52 is disposed at a level different than the level of the area 56 of the first gripping surface 42 adjacent to the character 52.

Preferably, the character 52 is formed by engraving a reverse character into the mold from which the writing aid 10 is made, so that when the writing aid 10 emerges from the mold, the character 52 will be formed as a part of the gripping surface 42, and be placed a raised level relative to the area 56 of gripping surface 42 adjacent to character 52. Alternately, the character 52 can be formed by forming a raised character in the mold, so that when the writing aid 10 emerges from the mold, the character 52 is at a depressed level relative to the area 56 of the first gripping surface 42 adjacent to the character 52.

The applicant has found that the use of the embossed or engraved character 52 of the present invention has several advantages over the use of a decal. The applicant has also found the use of a star as a character 52 is advantageous in that a star is a universally recognized symbol, and thus can facilitate sales of the writing aid 10 internationally, especially in countries, not using Roman characters, such as Taiwan, China, Japan, and Greece. In such countries, it may also be beneficial to use a character more indigenous to the area. For example, it may be beneficial in China to use the character 大, which means thumb.

As best shown in FIG. 1, a direction indicating means 62 (shown as an arrow) is formed on an exterior surface of the writing aid. The direction indicating means 62 is provided to help the user orient the writing aid 10 on the pencil 12. Due to the configuration of the writing aid 10, it can only be placed on a pencil 12 in one of two directions, either right side up or up side down. The applicant has found that the use of a direction indicating means 62 helps to indicate to users the proper direction of placement of the writing aid 10 on the pencil 12.

As shown in the drawings, the direction indicating means 62 is disposed approximately 90° from the mold split line 64. The direction indicating means 62 is formed by forming a raised, reverse arrow in the mold, which causes a relatively placement of the direction indicating means 62 at approximately 90° from the mold split line 64 facilitates the molding process by making it easier for the mold halves to pull away from the writing aid 10 cleanly during the molding process.

The right handed model writing aid 10 can be used by left handed persons. To do so, the left handed person places his first finger 24 on second gripping surface 44, his second finger 26 on first gripping surface 42 and his third finger 28 on third gripping surface 46. However, it has been found that the use of the right handed model by left handed persons is not as comfortable to left handed persons, as the use of the right handed model is by right handed persons.

Figure 7:
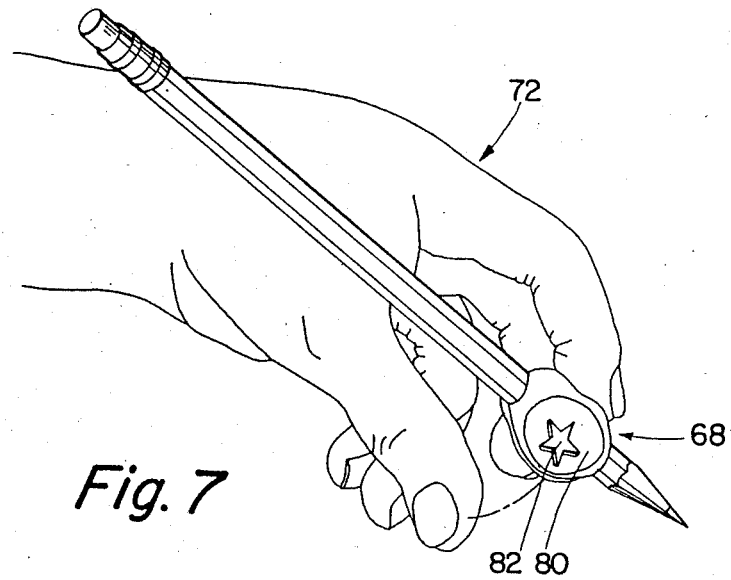
FIG. 7 is a perspective view of an alternate embodiment of the present invention illustrating the orientation of this alternate embodiment with respect to a user's left hand.

FIG. 7 illustrates a writing aid 68 which is especially useful for persons who write with their left hands 72. The left handed model writing aid 68 provides a more comfortable writing grip for a left handed person. The left handed model writing aid 68 is a mirror image of the right handed version 10, if a mirror is held in a plane generally parallel with the plane of the mold split line 64.

If the left handed model were viewed from its top (similar to the view shown in FIG. 3 for the right handed model), the second gripping surface (not shown) would be disposed counterclockwise of, and adjacent to, the first gripping surface 80 of the left handed model. The third gripping surface (not shown) would be disposed clockwise of and adjacent to the first gripping surface 80.

The left handed model 68 also includes a surface indicia mean on first gripping surface 80. Similar to the surface indicia mean of the right handed model 10, the surface indicia means of the left handed model 68 comprises a character 82 which is formed as a part of the first gripping surface 80, and is disposed at either a raised or lowered level relative to the area of gripping surface 80 adjacent to the character 82.

Figure 8:
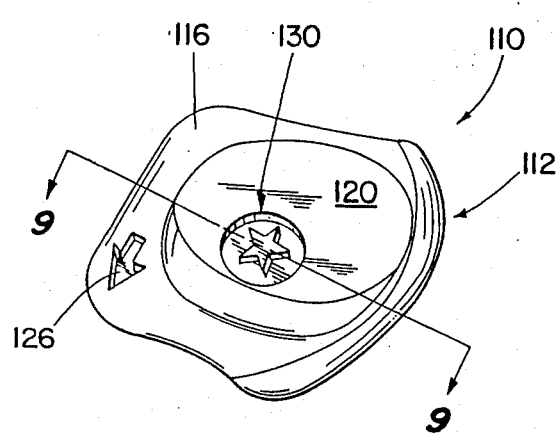
FIG. 8 is a front view of a second alternate embodiment of the present invention.
Figure 9:
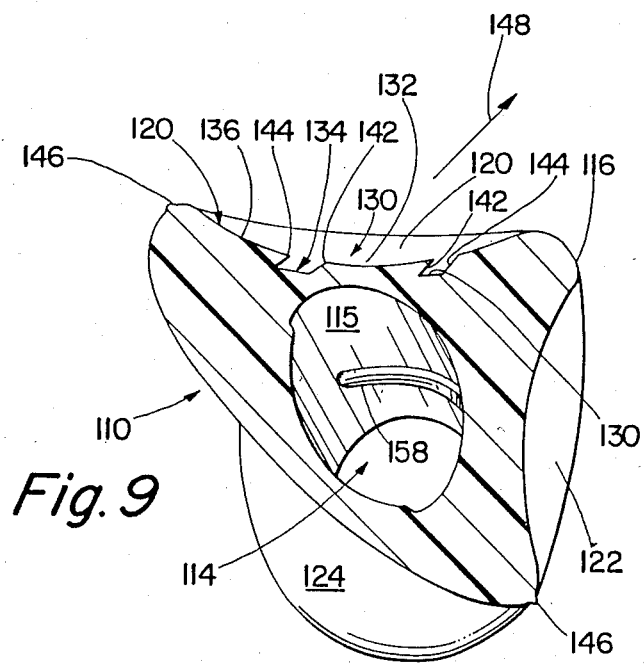
FIG. 9 is a sectional view taken along lines 9—9 of FIG. 8.
Figure 10:
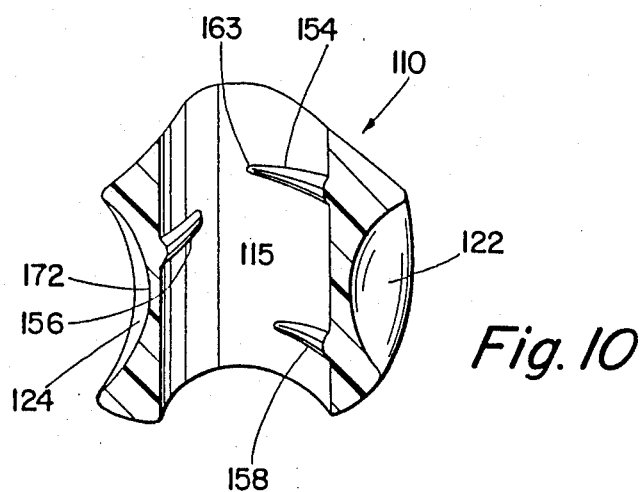
FIG. 10 is a sectional view of the embodiment of FIG. 8 (similar to the view of FIG. 5).

A third embodiment of the invention is shown in Figs. 8-10. The writing aid 110 shown in FIGS. 8-10 includes a body 112 having a cylindrical central bore 114 which is defined by a cylindrical wall 115. The diameter of the central bore 114 of this embodiment should be large enough to permit the writing aid to move easily along the barrel of the writing instrument (not shown). The writing aid 110 also includes a first gripping surface 120, a second gripping surface 122, a third gripping surface 124, and a direction indicating means 126. The first, second and third gripping surfaces, 120, 122, 124 and direction indicating means 126 are generally similar in function and appearance to the first, second and third gripping surfaces, 42, 44, 46 and direction indicating means 62 of the embodiment shown in FIGS. 1-6.

The embodiments shown in FIGS. 8-10 provide a gripping means and surface indicia means which improve over the indicia means 52 and gripping rings, 40, 41 of the embodiments shown in FIGS. 1-6.

The improved surface indicia means is shown best in FIGS. 8 and 9. The surface indicia means is a character 130 shown as comprising a star 132 contained within a recessed circle 134. Similar to character 52, character 130 is formed during the molding process as a part of the writing aid 110.

The circle 134 is at a level which is recessed relative to the area 136 of first gripping surface 120 adjacent to the character 130. The star 132 is preferably disposed at generally the same level as the area 136 of first gripping surface 120 adjacent to the character 130, and preferably follows the contour of first gripping surface 120. The use of a character similar to character 130 is believed to enhance the visibility of the surface indicia means.

More importantly, character 130 constitutes an improvement because it can be manufactured easier, and will result in fewer rejected parts than a writing aid 10 having a surface indicia means such as character 52. As best shown in FIG. 9, the sides 142 of the star 132 and the sides 144 of the recessed circle 134 are formed to be generally perpendicular to the plane of mold split line 146, and therefore parallel to the direction (indicated by arrow 148) in which the mold (not shown) pulls away from the writing aid 110.

By making sides 142, 144 generally parallel to the direction of the movement of the mold halves, the mold is more likely to pull away from the writing aid 110 cleanly, and not destroy or damage the character 130.

The improved gripping means of the embodiment shown in FIGS. 8-10 is best shown in FIGS. 9 and 10. The improved gripping means first includes the use of a relatively pliable plastic, such as a PVC material having a durometer of 55 shore A.

The improved gripping means also includes a first arcuate ring segment 154, a second arcuate ring segment 156 and a third arcuate ring segment 158. All three ring segments 154, 156, 158 are formed as a part of the cylindrical wall 115. Each of the three arcuate ring segments 154, 156, 158 extends along a portion of the wall 115. The ring segments 154, 156, 158 also extend radially inwardly from the wall 115 to help grip the writing instrument (not shown). The first, second and third gripping ring segments, 154, 156, 158 are generally parallel to each other, and extend in arcs generally perpendicular to the long axis of the writing instrument (not shown) inserted into the central bore 114.

The first arcuate ring segment 154 extends in an approximately 60 degree arc and has one terminus 163 in a position (on the cylindrical wall 115) corresponding generally to the upper middle portion of the first gripping surface 120. The other terminus (not shown) of first arcuate ring segment 154 is disposed in a position corresponding generally to a position above the middle portion of second gripping surface 122. The first arcuate gripping ring 154 is also disposed just slightly above (as viewed in FIG. 10) the thinnest portion of the portion of the cylindrical wall 115, corresponding to the first gripping surface 124.

The second arcuate gripping ring segment 156 extends in an approximately 180° arc in a position on the cylindrical wall 115 corresponding generally to a position just axially above the radial nadir 172 of the third gripping surface 124. The second gripping ring segment 156 has its termini at positions on, or adjacent to a plane corresponding to the plane of the mold split line 146. The second gripping ring segment 156 is positioned just above the thinnest part of the cylindrical wall 115 corresponding to third gripping surface 124.

The third arcuate gripping ring segment 158 is generally parallel to the first gripping ring segment 154, and is disposed preferably directly, axially below the first arcuate gripping ring segment 154. The third gripping ring segment 158 also extends in an approximately 60° arc.

The use of gripping ring segments 154, 156, 158 in lieu of circular gripping rings (such as gripping rings 40, 41) has several advantages. One advantage achieved by the use of the segments 154, 156, 158 is that the segments 154, 156, 158 do not inhibit the expansion of the diameter of the cylindrical wall 115 as much as the continuous rings 40, 41. This advantage is useful in that it enables a writing aid 110 having a central bore 114 of a certain diameter to be placed on a wider variety of writing instruments. One particular example is that a writing aid 110 sized primarily for a standard sized hexagonal pencils can expand to also fit a "youth pencil" having a larger diameter. These thickened youth pencils are often issued to children in kindergarten, first grade and second grade.

The pliable plastic, and the positioning of the arcuate gripping ring segments 154, 156, 158, enable the central bore 115 to be made large enough to be moved along the barrel of a writing instrument easily, while still securely gripping the writing instrument (not shown) when the device is in use. The first and second gripping ring segments 154, 156 are especially helpful in securing the writing aid 110 to the writing instrument. It has been found that the user's first finger and third finger exert the greatest gripping force on a writing instrument when the writing instrument is being held and used. The radially inwardly directed gripping force exerted by the user is transmitted through the pliable plastic to cause the first and second arcuate gripping ring segments 154, 156 to press against the barrel of the writing instrument, and thus securely engage the writing aid 110 to the writing instrument. By placing the first and second arcuate gripping ring segments 154, 156 in a position adjacent the thinnest portions of the cylindrical wall 115, this radially inwardly direct force exerted by the user causes the first and second gripping rings 154, 156 to move inwardly and engage the writing instrument securely.

Although the invention has been described in detail with reference to the illustrated preferred embodiments, variations and modifications exist within the scope and spirit of the invention as described and as defined in the following claims.

What is claimed is:

1. A device for aiding in the gripping of an elongated hand held writing instrument comprising, a body having a central bore for receiving the hand held writing instrument and an exterior, the exterior including a first gripping surface positioned for receiving the user's first finger, a second gripping surface positioned for receiving the user's second finger and a third gripping surface positioned for receiving the user's third finger, at least one of the first, second and third gripping surfaces including a surface indicia means for providing a reference for placement of at least one of the user's fingers, the surface indicia means comprising at lease one character formed as part of at least one of the first, second and third gripping surfaces, the character being disposed at a level different tnan the level of the area of said at least one surface adjacent to the character.

2. The invention of claim 1 further comprising a direction indicating means for indicating the direction of placement of the device on the writing instrument.

3. The invention of claim 2 wherein said direction indicating means comprises a direction indicating character formed on the device.

4. The invention of claim 1 further comprising a direction indicating character formed on the device for indicating the direction of placement of the device on the writing instrument, the direction indicating character comprising an arrow engraved into the device.

5. The invention of claim 1 further comprising a direction indicating character formed on the device for indicating the direction of placement of the device on the writing instrument, the direction indicating character comprising a raised arrow.

6. The invention of claim 1 wherein the central bore is defined by a wall, further comprising at least one gripping means formed on the wall for gripping the writing instrument.

7. The invention of claim 6 wherein said gripping means comprises at least one arcuate segment extending radially inwardly from the wall.

8. The invention of claim 6 where said device is comprised of a sufficiently pliable material to permit the user to securely engage the gripping means to the writing instrument when the user grips the device on said first, second and third surfaces.

9. A device for aiding left handed person in the gripping of an elongated hand held writing instrument comprising a body having a central bore for receiving the hand held writing instrument and an exterior, the exterior including, a top, a bottom, a first gripping surface positioned for receiving the user's first finger, a second gripping surface for receiving the user's second finger, and a third gripping surface for receiving the user's third finger, the first, second and third gripping surfaces being disposed relatives to each other such, that when the device is viewed from its top, the second gripping surface is disposed counter-clockwise and adjacent to the first gripping surface, and the third gripping surface is disposed clockwise of and adjacent to the first gripping surface, and a surface indicia means comprising a character formed on at least one of the first, second and third surfaces as a part of the device.

* * * * *